United States Patent [19]

Oike

[11] Patent Number: 4,736,886

[45] Date of Patent: Apr. 12, 1988

[54] DISK TYPE STEAM TRAP

[75] Inventor: Tadashi Oike, Hyogo, Japan

[73] Assignee: TLV Co., Ltd., Kakogawa, Japan

[21] Appl. No.: 770,846

[22] Filed: Aug. 29, 1985

[30] Foreign Application Priority Data

Oct. 15, 1984 [JP] Japan .............. 59-156030[U]

[51] Int. Cl.$^4$ .............................................. F16T 1/08
[52] U.S. Cl. ................................. 236/59; 236/101 D
[58] Field of Search .................. 236/59, 101 D, 93 R; 374/206, 207; 428/616

[56] References Cited

U.S. PATENT DOCUMENTS

| | | | |
|---|---|---|---|
| 2,121,259 | 6/1938 | Parsons | 428/616 |
| 2,283,075 | 5/1942 | Matthews | 428/616 |
| 2,298,110 | 10/1942 | Crum | 374/207 X |
| 2,346,573 | 4/1944 | Gunn | 428/616 |
| 2,425,687 | 8/1947 | Savolainen | 428/616 |
| 3,011,719 | 12/1961 | Jorgensen | 236/59 |
| 3,715,894 | 2/1973 | Widdowson | 236/101 D X |
| 4,192,458 | 3/1980 | Pinnock et al. | 236/93 R X |
| 4,227,646 | 10/1980 | Hart et al. | 236/93 R |

FOREIGN PATENT DOCUMENTS 1301983  1/1973  United Kingdom ............... 236/59

Primary Examiner—William E. Tapolcai
Attorney, Agent, or Firm—Toren, McGeady and Goldberg

[57] ABSTRACT

A disk type steam trap having a valve disk adapted to engage a valve seat with a double-coiled bimetallic member being provided operatively interposed between the valve disk and the valve seat on one side of the valve seat to lift and lower the valve disc relative to the valve seat in response to temperature change. The bimetallic member comprises a double-coiled body expanding at lower temperatures and contracting at higher temperatures.

4 Claims, 1 Drawing Sheet

DISK TYPE STEAM TRAP

The present invention relates to a disk type steam trap designed for installation on a steam pipeline so that condensed water produced therein may be automatically discharged. More particularly, it relates to such a steam trap including a bimetallic member for preventing the air locking of the disk of the steam trap.

A disk type steam trap usually includes a valve disk adapted to rest on or be moved away from a valve seat defined by an inner seat ring and an outer seat ring of the trap with a variable pressure chamber being defined behind the disk. The position of the disk is controlled by pressure variation in the variable pressure chamber to effect the automatic discharge of condensed water.

Air remaining in the variable pressure chamber, however, prevents the opening of the disk during the beginning of trap operation even if cold condensed water or air may flow into the trap. If air flows into the variable pressure chamber during trap operation, the disk is moved into its closed position instantaneously, as when steam flows into the chamber. Air is not condensed, while steam is. Once that the trap is closed, therefore, it does not open even if condensed water flows thereinto. This phenomenon is known as air locking.

A bimetal used in the prior art to overcome the problem of air locking is shown in Japanese Utility Model Publication No. 27190/1970.

In the device disclosed, the bimetal is an arcuate strip disposed in an annular groove between the inner and outer seat rings and it has one end secured thereto. The bimetallic strip has a free end which is bent by contraction with a drop in temperature to force the valve disk away from the valve seat to let air out of the variable pressure chamber, whereby the problem of air locking is intended to be overcome.

The trap described above is, however, not free from the problem of air locking. The bimetal strip is not sufficiently strong to hold the valve disk in its open position at a relatively low temperature. The bimetallic strip becomes stronger if its thickness is increased, but its thickness is limited by the width of the annular groove. A bimetallic member having a larger thickness is less sensitive to heat and is likely to develop undesirably large stresses which shorten its life.

Accordingly, the present invention is directed toward providing a steam trap having a bimetallic member which is sufficiently small for accommodation in its variable pressure chamber and yet sufficiently strong to insure proper trap operation.

SUMMARY OF THE INVENTION

Briefly, the present invention may be described as a disk type steam trap comprising a valve disk, a valve seat having a hole, and a double-coiled bimetal member disposed between the disk and the valve seat and in the hole of the valve seat, the bimetal member comprising a coiled strip formed into a coil which expands at low temperature to force the disk away from the valve seat and which contracts at high temperature to allow the disk to rest on the valve seat.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DETAILED DESCRIPTION OF THE PREFERRED EMBODIMENT

Figure 1:
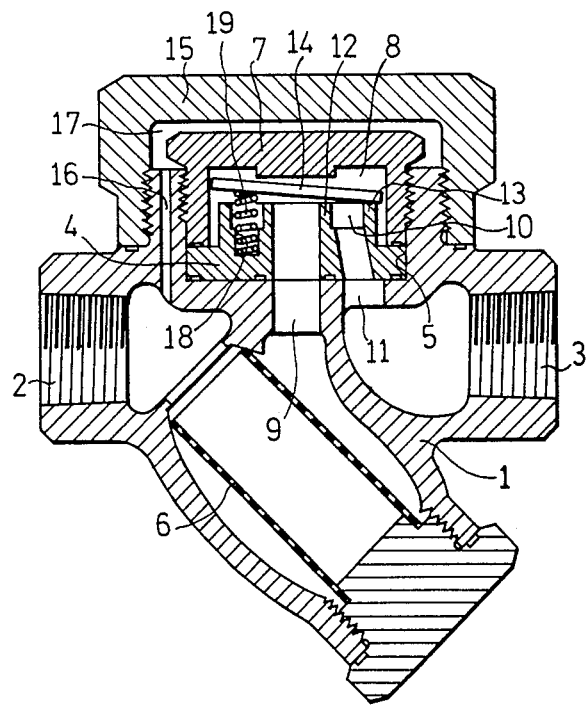
FIG. 1 is a longitudinal sectional view of a disk type steam trap embodying the invention.

Referring now to the drawing, a steam trap embodying this invention is shown as comprising a main body 1 having an inlet port 2 and an outlet port 3 which are substantially coaxial with each other, and a recess 5 in which a valve seat member 4 is fitted. The inlet port 2 is in fluid communication with the center of the recess 5 and a screen 6 is disposed between the inlet port 2 and the recess 5. The outlet port 3 is in fluid communication with a peripheral portion of the recess 5.

Two annular gaskets are disposed between the valve seat member 4 and the bottom of the recess 5. An inner cover 7 is threadedly connected into a cylindrical projection defining the recess 5 and thereby secures the valve seat member 4 to the main body 1. An annular gasket is disposed between the valve seat member 4 and the inner cover 7. The valve seat member 4 and the inner cover 7 define a variable pressure chamber 8 therebetween.

The valve seat member 4 has an inlet port 9 extending through its center and communicating with the inlet port 2 of the main body 1. The valve seat member 4 also has an annular groove 10 encircling the inlet port 9 and an outlet port 11 connected with the annular groove 10 and communicating with the outlet port 3 of the main body 1. The inlet port 9 and the annular groove 10 define an inner seat ring 12 therebetween and an outer seat ring 13 encircles the annular groove 10. A valve disk 14 is provided in the variable pressure chamber 8. It is not secured anywhere, but is movable so as to come to rest on a valve seat defined by the inner and outer seat rings 12 and 13 or so as to move away therefrom. An outer cover 15 surrounds the inner cover 7 and is threadedly connected about the cylindrical projection defining the recess 5. An annular gasket is disposed between the main body 1 and the outer cover 15. The inner and outer covers 7 and 15 define a heat insulating chamber 17 therebetween. The cylindrical projection of the main body 1 has a passage 16 connecting the main body 1 adjacent to the inlet port 2 and the heat insulating chamber 17.

Figure 3:
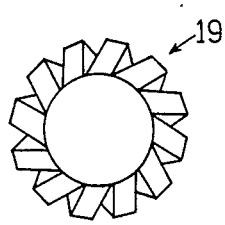
FIGS. 2 and 3 show a process for making the double-coiled bimetal shown in FIG. 1, with FIG. 2 being a front elevational view of an intermediate product made by coiling the bimetal strip, and FIG. 3 being an enlarged top plan view of the double coiled bimetal of FIG. 1 formed by coiling the coiled strip of FIG. 2 again.
Figure 2:

The valve seat member 4 has a hole 18 formed by deepening the annular groove 10 in a portion on the opposite side of the inlet port 9 from the outlet port 11. A double-coiled bimetallic member 19 is disposed in the hole 18. The bimetallic member 19 comprises a strip coiled as shown in FIG. 2 and coiled again as shown in FIG. 3.

In the operation of the steam trap in accordance with the invention, during the beginning of trap operation, when it is still at a low temperature, the bimetal 19 is in its expanded state and has an upper end projecting above the valve seat on the top of the valve seat member 4, keeping the disk 14 in its open position away from the valve seat, as shown in FIG. 1. A large quantity of cold condensed water and airflow into the trap through the inlet ports 2 and 9 and out through the annular groove 10 and the outlet ports 11 and 3 rapidly. If hot condensed water comes to flow into the trap, the bimetallic is heated and contracts into the annular groove 10, allowing the disk 14 to rest on the valve seat. The steam trap thereafter functions to discharge condensed water, while retaining steam, in accordance with the principle of operation which is well known in the art. If air flows into the variable pressure chamber 8, it forces the disk 14 into its closed position, but if the temperature of the fluid in the chamber 8 drops below a certain level, the bimetal 19 expands and forces the disk 14 open, whereby the problem of air locking is avoided.

The bimetal 19 is located in the annular groove 10 in eccentric relationship to the disk 14. This arrangement develops a strong force for preventing the air locking of the disk in accordance with an operating principle similar to that of a lever.

The steam trap in accordance with the invention provides several advantages. Since the bimetal member consists of a coil formed from a coiled strip, a large amount of bimetallic material can be formed into a small size which can easily be fitted in the annular groove or hole 18. Although it is small, the member 19 is deformable to a great extent and develops a strong force, as it is formed from a large amount of bimetallic material.

The invention thus produces a number of special effects. The bimetallic member consists of a bimetallic ring formed by bending a strip cylindrically and disposed about the tapered outer peripheral surface of an outer seat ring. The bimetallic ring rises along the tapered surface of the outer seat ring at a lower temperature to lift a valve disk open to let air out. This bimetallic ring can, however, lift the disk only to a small extent and the trap requires a lot of time for discharging cold condensed water and air during the beginning of its operation. Since the bimetallic member in the steam trap of the invention is of the double-coiled type, it can lift the valve disk open to a large extent. The steam trap can, therefore, discharge cold condensed water and air quickly and it can be placed in normal operation within a short time.

Insofar as the bimetallic ring rising along the tapered surface can lift the disk only to a small extent, it is impossible to accomplish the necessary discharge of air unless the angle of the tapered surface, the radius of the bimetallic ring and the depth of the groove in which the bimetallic ring is disposed are precise. According to this invention, the bimetal can lift the disk to a large extent and there is no appreciable variation in the temperature at which the trap opens, even if it may not have a very high dimensional accuracy. Therefore, the trap of this invention is inexpensive to manufacture.

A simply coiled bimetallic strip is likely to collapse under the weight of the disk. According to this invention, the bimetal comprises a double-coiled strip which withstands the weight of the disk and is reliable in operation.

While a specific embodiment of the invention has been shown and described in detail to illustrate the application of the inventive principles, it will be understood that the invention may be embodied otherwise without departing from such principles.

What is claimed is:

1. A disk type steam trap comprising a valve disk, a valve seat defining a hole, an outlet port located to be opened and closed by said valve disk and a double-coiled bimetallic member disposed between said disk and said valve seat and in said hole, said bimetallic member comprising a bimetal strip formed into a first coil which is coiled upon itself in a second coil to form a double-coiled configuration, said bimetallic member expanding at a low temperature to force said disk away from said valve seat and contracting at a high temperature to allow said disk to rest on said valve seat, said hole with said bimetallic member therein being located in a side of said valve seat opposite said outlet port.

2. A disk type steam trap assembly comprising: a housing defining an inlet port, an outlet port and fluid passage means in flow communication therebetween; a valve seat member defining a valve seat forming part of said fluid flow passage means; a valve disk adapted to seat on said valve seat for opening and closing said part of said fluid flow passage means; and a double-coiled bimetallic member operatively interposed between said valve disk and said valve seat member, said bimetallic member being arranged to engage said valve disk on one side of said valve seat; said bemetallic member comprising a coiled strip formed into a first coil which is coiled upon itself in a second coil to form a double-coiled configuration and operating to expand at low temperature to force said disk away from said valve seat and to contract at high temperature to allow said disk to rest on said valve seat, said bimetallic member engaging said valve disk on a side of said valve seat opposite said outlet port.

3. An assembly according to claim 2, further comprising an inner cover threadedly engaged with said housing and defining between said inner cover and said housing a variable pressure chamber within which said valve disk is located.

4. An assembly according to claim 3, further comprising an outer cover threadedly engaged with said housing and enclosing said inner cover, said outer cover and said inner cover defining therebetween a heat insulating chamber.

* * * * *